No. 791,240. PATENTED MAY 30, 1905.
C. BOUCHER.
MANUFACTURE OF BOTTLES, FLASKS, &c.
APPLICATION FILED JULY 6, 1897.
3 SHEETS—SHEET 2.
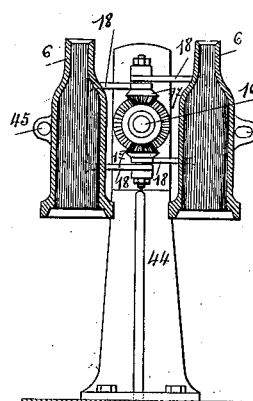
FIG. 5.
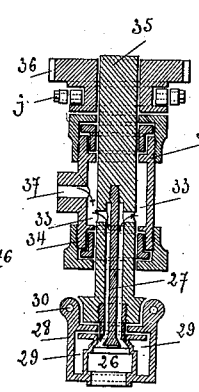
FIG. 8.
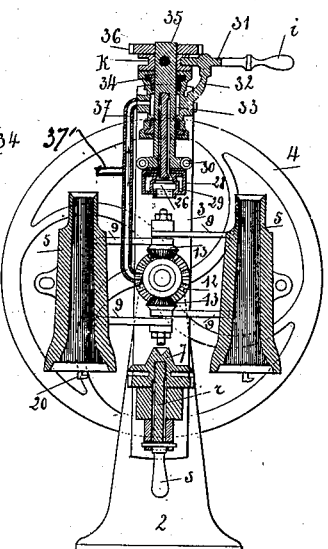
FIG. 6.
FIG. 7.
WITNESSES:
INVENTOR:

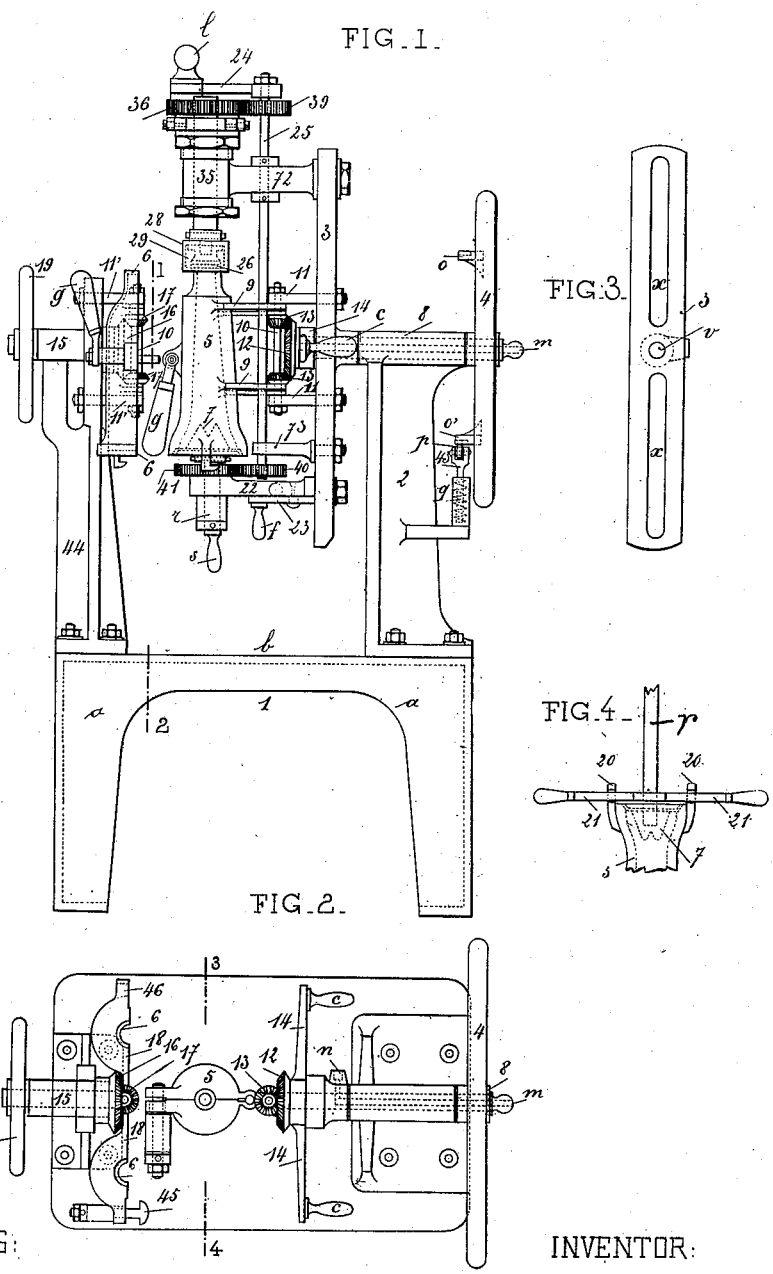

No. 791,240. PATENTED MAY 30, 1905.
C. BOUCHER.
MANUFACTURE OF BOTTLES, FLASKS, &c.
APPLICATION FILED JULY 6, 1897.
3 SHEETS—SHEET 3.
FIG. 10.
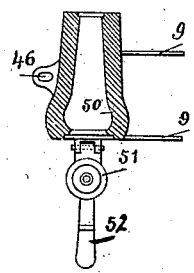
FIG. 9
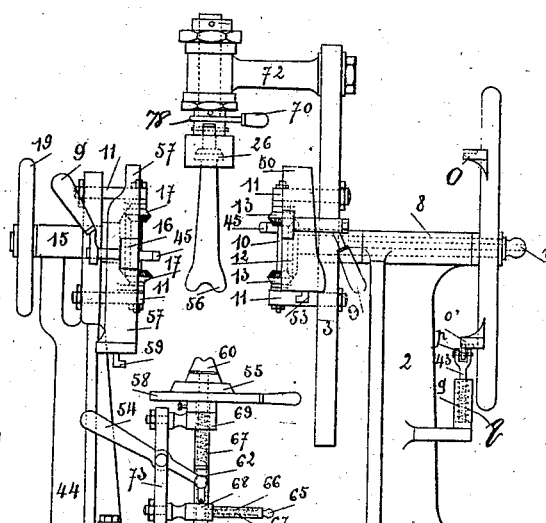
FIG. 11.
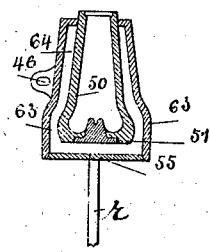
FIG. 12.
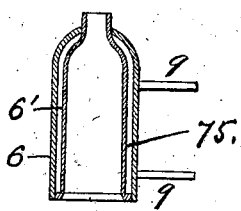
FIG. 14.
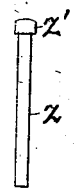
Fig. 14ˣ
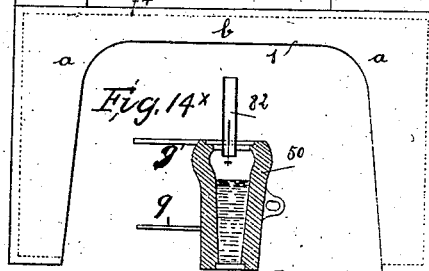
FIG. 15.
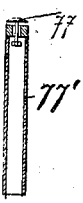
Fig. 13.
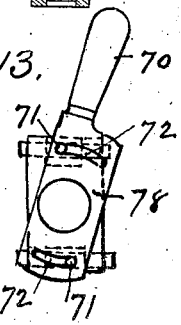
WITNESSES:
INVENTOR:

No. 791,240.

Patented May 30, 1905.

UNITED STATES PATENT OFFICE.

CLAUDE BOUCHER, OF COGNAC, FRANCE.

MANUFACTURE OF BOTTLES, FLASKS, &c.

SPECIFICATION forming part of Letters Patent No. 791,240, dated May 30, 1905.

Application filed July 6, 1897. Serial No. 643,619.

*To all whom it may concern:*

Be it known that I, CLAUDE BOUCHER, a citizen of the Republic of France, residing at Cognac, Charente, France, have invented certain new and useful Improvements in or Relating to the Manufacture of Bottles, Flasks, and Similar Articles, of which the following is a specification.

The machine forming the subject of the present application relates to the manufacture of bottles, flasks, vases with or without handles, and other similar articles of blown glass and enables the employment of special skilled labor to be dispensed with. The mechanism of this machine is so simple and easily understood that it does not require the employment of specially skilled workmen, and workmen unacquainted with the glass industry can by means of this apparatus manufacture bottles and similar objects. Besides, the articles manufactured in this way issue from the molds of this machine completely finished and can be carried directly to the annealing-oven, where they are left to cool gradually, whereby a greater solidity and regularity of structure is imparted to them than is the case with the articles manufactured by means used hitherto, as the molecular changes in the material take place under better conditions.

This machine is illustrated in detail in the accompanying drawings as applied to the manufacture of bottles, wherein—

Figure 1 is a longitudinal elevation; Fig. 2, an under side plan view; Fig. 3, a front view of the bar; Fig. 4, a part of the rough mold; Fig. 5, a vertical cross-section on the line 1 2 of Fig. 1; Fig. 6, a vertical cross-section on the line 3 4 of Fig. 2; and Fig. 7 shows the rough mold closed, the bottom of the mold being raised and resting against the bar 3. The mold is thus shown in the position it occupies at the moment when the glass for the manufacture of the bottle or other object is about to be poured into it. Fig. 8 is a section of the entrance-mold for forming the neck, collar, and part of the neck of the bottle. This figure is drawn to a scale double that of the remaining figures. Fig. 9 is a longitudinal side elevation showing the shape which the glass assumes in the rough mold when it is desired to make bottles with recessed bottoms. Fig. 10 is a view of the rough mold and its bottom. Fig. 11 is a view of the rough mold surrounded by a casing, so as to form an air-chamber. Fig. 12 is a view of the finishing-mold surrounded by a casing enabling an empty space to be obtained which is filled with some bad conductor of heat in order to maintain this mold at a sufficiently high temperature. Fig. 13 is a view of the mechanism enabling the entrance-mold, Fig. 9, to be closed and opened. Figs. 14 and 15 show different forms that may be given to rods screwed into the tubes through which compressed air is admitted. Fig. $14^\times$ is a detail sectional view showing the method of introducing steam into the rough mold 50.

The same reference numbers and letters indicate the same parts throughout the drawings.

1 is the frame, consisting of feet $a$ and bed-plate $b$.

2 is a bracket for the hollow spindle or bearing 8. This bracket is secured to the plate $b$ by means of bolts or by any other suitable means.

3 is a bar to which are secured, first, the rough mold; second, the mold in which the top of the bottle is formed; third, the bottom part for the rough mold and for the finishing-mold; fourth, the tube through which compressed air is admitted; fifth, the mechanism enabling the bottle to be rotated or rocked during the time that it is blown in the finishing-mold. The bar, which is shown in front view in Figs. 3 and 6 and edgewise in Figs. 1, 7, and 9, serves for alternately turning the rough mold top and bottom upward, according to the stage of manufacture the article has reached. The rough mold, the lip or collar mold, the bottom, and other parts arranged on this bar are secured in slots $x$ by bolts, keys, or any other means. These slots may be replaced by holes affording passage for bolts or any other suitable device for securing the parts to the bar.

4 is a hand-wheel secured to the spindle 8 to enable the bar to be rotated. This hand-wheel and bar are keyed onto the spindle 8. In order to enable the rough mold to be fixed in the two positions which it must alternately occupy—first bottom upward for receiving the glass, then bottom downward for transferring the rough article to the finishing-mold—there are fixed on this hand-wheel 4 two stops $o$ $o'$, adapted to engage with the fork 43, secured to the bracket 2. This fork carries at the top a roller $p$ and at the bottom a spring $q$. It will be now easy to understand that when the hand-wheel 4 is caused to turn the stops $o$ $o'$ alternately press against the roller $p$, which descends against the pressure of the spring according to the position to be given to the rough mold 5; but this roller being immediately afterward raised by the spring $q$ engages with a groove in the bottom of the stop, whereby the hand-wheel and consequently also the rough mold and all the parts secured to the bar are stopped and held in place.

5 is the rough mold. This first (rough) mold is narrower than the second (finishing) mold, so as to enable glass which is of a paste-like, almost liquid, consistency when it is poured into the mold to spread in sufficient quantity toward the bottom of the mold, so as a give sufficient thickness to the bottom part of the bottle. This mold, however, must be sufficiently wide at the lower part to enable the bottom 7, serving to close the finishing-mold, to be also used for closing the rough mold, said bottom being common to both molds. As the rough mold receives glass of very high temperature, and consequently becomes very hot rapidly, I make the walls of said mold thick enough to prevent glass from adhering to it, owing to the high temperature that a thin mold would reach. The rough mold is closed at the lower end at the moment when the necessary amount of glass for manufacture of a bottle has been admitted into its interior by the collar-mold 26. At the other end it is closed by the bottom 7, which is securely held by means of a bayonet-joint, which will be hereinafter fully described.

6 is the finishing-mold. This mold must be interiorly the exact shape of the bottle, flask, or other object to be manufactured. The glass has sufficient plasticity when the lump is introduced into this mold to take the exact shape under the pressure of compressed air. Nevertheless, if the bottom had not partly acquired its finished shape in the rough mold it would be impossible to obtain this shape in a satisfactory manner in the finishing-mold, since the outer surface of the bottom part would have become solid by contact with the rough mold and could not be pressed farther out or expanded, so as to touch the walls of the finishing-mold and made to acquire the desired diameter.

As the glass cannot adhere to the walls of the finishing-mold when the partly-formed bottle is introduced into it, as it has acquired the necessary consistency in the rough mold, and as, on the other hand, it would lose a great part of its brilliancy if the walls of this second mold were not brought to the desired temperature, and as bottles which are generally made of glass that is but slightly malleable would present a hammered appearance, the walls of the finishing-mold are made of less thickness than those of the rough mold. Moreover, in order to make this mold suitably hot and to easily maintain it at this temperature during the manufacture, the mold is formed with hollow walls, as shown in Fig. 12. In this manner the space 6', formed by the hollow walls of the mold 6, being filled with clay, plaster, coal, or any other substance which is a bad conductor of heat, or being closed in an air-tight manner, so as to form an air-chamber, keeps the interior of the finishing-mold at a sufficiently high temperature to avoid formation of irregularities or seams on the outside of the bottles and increases their strength by maintaining them longer in a red-hot condition.

The finishing-mold 6 is closed at both ends like the rough mold 5 by the bottom 7 and by the collar-mold 26, which fits against the neck of said molds.

The rough mold and the finishing-mold are placed on the same level and opposite each other, as shown in Figs. 1, 2, and 9. These two molds are secured by arms 9 and 18, serving as hinges, on the spindles 10, rotating in bearings 11, secured to their vertical supports. The supports of the rough mold being fixed to the bar 3, it is easy to understand that when this bar is caused to move by means of the hand-wheel 4 the rough mold is alternately placed neck upward and neck downward, according to the stage of manufacture, as has been explained before. Owing to the simple way in which these molds are arranged, it is extremely easy to replace them when another article is to be manufactured and a differently-shaped mold is required. It is sufficient for this purpose to unscrew the nuts in order to remove the rod 10, which holds the molds by means of arms 9 or 18, according to whether the mold in question is the rough or the finishing mold, then to put in the required molds, pass the rod 10 through the hinge-arms 9 or 18 of these molds and through the brackets 11, and to screw on the nuts. The rough mold 5 must be completely open, as shown in Fig. 6, when the rough article being produced is to be placed in the finishing-mold 6, which is quickly closed again and which then occupies exactly the same position as before occupied by the rough mold. The rough mold is made in two longitudinal parts, as shown in Fig. 6. These two halves of the mold are brought together or moved apart, so as to close or open the mold, by means of a toothed bevel-wheel 12, secured on the end of the spindle 8, and of pinions 13, secured on the arms 9 of the mold. It is sufficient for this purpose to raise or to lower one end of the lever 14, (according to the position occupied by the mold.) This lever can be best seen in Fig. 2, where it is shown very clearly and terminates in handles c. The movement of this lever causes the toothed wheel 12 to rotate the pinions 13. As the pinions are secured to the arms 9 of the rough mold and turn in opposite directions, (one from left to right and the other from right to left,) they thus open or close the two parts of the rough mold when the lever is raised or lowered, (according to the position occupied by the mold.)

The lever used to close and to open the rough mold preferably carries two handles, as shown, so as to have one of them always within reach of the attendant whether the mold have its bottom upward or downward.

The parts of the finishing-mold are brought nearer to each other or farther apart by means of a hand-wheel 19, which actuates the spindle 15, carrying the toothed wheel 16, which rotates the pinions 17 on the arms 18 of this mold. It is sufficient for this purpose to turn this hand-wheel to the right or to the left, according to whether the finishing-mold is to be closed or opened. Of course a lever similar to that used for closing and opening the rough mold may be employed for the finishing-mold.

7 is the separate bottom part used for closing both the rough mold and the finishing-mold at their widest parts. This bottom has a conical part and is used when it is desired to form bottles or other similar articles having recessed or coned bottoms. According to this arrangement the glass molds itself on the conical part, and thus reproduces in the rough mold under the action of blowing only and without necessitating any mechanism the exact shape of the bottom of the mold and of the conical portion upon it. This arrangement also enables the reproduction or formation on the bottom of the bottle in a very easy and distinct manner inscriptions, trade-marks, names of firms, or designs of any kind. These inscriptions can also be produced in the coned part of the bottles.

The bottom 7, serving to produce the bottom of a bottle, as just explained, and also serving as a cover for the rough and for the finishing molds, must be flat when it is desired to produce bottles with flat bottoms. It must be concave for bottles with convex bottoms—such, for instance, as soda-water bottles—and it must be convex to enable concave bottoms to be produced; but whatever be the shape of the bottom used it must have at the outer rim the desired dimensions in order to suitably close both the rough and the finishing molds, as it is common to both molds.

In order to avoid formation of burs or irregularities which would take place at the edge at the moment of blowing, mainly in the rough mold, if the bottom 7 were not held in place very securely, the bottom is held securely in place preferably by means of a kind of bayonet-joint (shown in Figs. 4 and 6) and consisting of two hooks 20, secured at the bottom of the rough mold 5, and a bar 21, mounted on the rod of the bottom 7, so as to be capable of turning about said rod as an axis. To operate this joint, it is sufficient to introduce the bar 21 under the hooks 20. In this manner the closing is effected in a very secure and reliable manner, so that the bottom 7 is securely held against the rough mold, and consequently prevents the glass which is still liquid from penetrating between the rough mold and the bottom 7 when it is blown in said mold. The glass having become sufficiently solidified in the first mold, so as to prevent any risk of seams being formed at the junction edges in the finishing-mold, and, on the other hand, the bayonet system of closing used for the rough mold, preventing the bottom 7 from being caused to rotate or to reciprocate when turning of the bottle during the injection of compressed air takes place in the following mold the bottom in the finishing-mold is held in place in the following manner, as shown more particularly in Fig. 7. This closing device consists of a hinged bracket 22 and a plate 23, carrying the handle f, Fig. 1. This plate 23, forming a kind of latch, is pushed laterally under the hinged bracket 22 of the bottom in order to keep it firmly applied against the finishing-mold during the blowing of the bottles, but allowing at the same time a rotary or reciprocating motion to be communicated to this bottom by the crank 24 and spindle 25, as will be explained later on. The rough mold having been placed neck downward, as shown in Fig. 7, at the moment when it is about to be filled with glass necessary for the manufacture of a bottle, is closed at the top of the neck by the mold 26 and by the rod 27, placed at the opening of the neck.

The mold which serves to produce the rim and a part of the neck of the bottle or other article to be manufactured consists of the following parts: 26 is the part of the mold in which is formed the top or mouth of the bottle and is alternately placed against the neck of the rough and finishing molds. This part 26 of this mold, in which is formed the rim and the top of the neck of the bottle, is divided into two or more parts, so as to enable them to be moved apart when it is desired to remove the bottle in order to carry it to the annealing-oven. 28 is a casing forming round the mold 26 a hollow space 29, in which the air is heated to a high temperature. This hollow may also be filled with clay, plaster, coke, or any other substance which is a bad conductor of heat. The two means just indicated enable the mold 26 to be heated to and maintained at a suitable temperature, even red-hot, and consequently prevent the neck of the bottle from becoming cooled too quickly. 30 represents hinges enabling the sides of the mold to be opened and to be closed at the moment in which the glass is to be poured into the rough mold 5 and to open it when it is desired to remove the bottle from the mold. 31 is a lever terminating in a handle *i* and the other end in a fork. This lever rests on the bracket 32. When the handle *i* is depressed, the end of the lever raises the mold 26, so as to enable the bottle to be removed for the purpose of removing it to the annealing-oven. The fork of the lever 31 may, if desired, be provided with two rollers to enable the spindle 35, which transmits rotary motion to mold 26, to turn more easily. Consequently when the bottles need not be turned in the mold these rollers become superfluous.

33 is a reservoir into which compressed air enters through the pipe 37. This air passes in the direction indicated by the arrows to the orifice of the mold 26, where it passes round the rod 27 into the glass as soon as it is poured into the rough mold 5 and afterward into the unfinished bottle, when it has been inclosed in the finishing-mold 6, in order to force the rough bottle to take the shape of this mold.

34 is a stuffing-box used to prevent the escape of the compressed air introduced through the pipe 37.

The rod 27, which closes the mold 26, has a suitable diameter to leave a space between the rod and the neck of the mold 26 in order to allow compressed air to pass. The diameter of this rod 27, whether it terminates in a thickened portion or carries at the end a plate against which the glass strikes, must also correspond to the dimensions which it is desired to give to the interior of the neck of the bottle or other article. In order to prevent the glass from solidifying on this rod at the moment when it is poured into the rough mold, it is preferably made of coke, clay, talc, or any other suitable substance which is a bad conductor of heat. In this manner the glass is maintained at the required degree of plasticity and by simply forcing it by blowing the interior of the neck can be formed without necessitating the passage of a core to attain this result.

The mold just described is secured to the bar 3 by means of a bracket 72.

35 is a spindle of the mechanism enabling the bottle to be moved during the time that it is being blown in the finishing-mold. 36 is a toothed wheel mounted on this spindle 35.

37 is the pipe admitting compressed air from the hollow spindle 8 to the reservoir 33 above the mold 26.

The crank 24 serves to actuate the mechanism by means of which a rotating or reciprocating motion is communicated to the bottle in the finishing-mold. This mechanism consists of the crank 24 on the spindle 25, carrying toothed wheels 39 and 40, and of the spindle 35, carrying the toothed wheel 36 and toothed wheel 41, secured on the rod of the bottom of the bottom mold 7. The spindle 25 of the mechanism just described is carried in brackets 72 and 73 on the bar 3. To operate this mechanism, the handle *t* of the crank 24 is given a reciprocating or rotary motion, which is then transmitted by the wheel 36 to the mold 26 and by the wheels 39, 40, and 41 to the bottom 7. As the bottle is held at its upper part by the mold 26 and at its lower part by the bottom 7 it is forced to participate in the movement of these two parts. Nevertheless it is advisable in order to facilitate the movement of the bottle during the time that it receives its shape in the finishing-mold to rub the inner walls of said mold with some greasy substance which possesses the property of leaving a layer of carbon on the metal. The spindle 8 carries the lever 14, Fig. 2, and its toothed wheel 12 the bar 3 and the hand-wheel 4. This spindle is made hollow, so as to serve for conducting compressed air to the molds. Air enters at *m* and passes out at *n*, Fig. 2, and is led through the tube 37 to the reservoir of the mold 26.

44 is a bracket on which is mounted the finishing-mold 6 by means of arms 18. This bracket also carries a spindle 15, at the end of which is secured the toothed wheel 16, which being actuated by the hand-wheel 19 causes the pinions 17 to move, closing or opening said mold exactly as has been described for the rough mold 5.

45 represents studs engaging with openings 46 in order to constitute a closing device for the rough mold 5 and for the finishing-mold 6 in the following manner: When the two parts composing each of these molds have been brought near together by means of the levers and toothed wheels already described, the studs or projections 45 are caused to engage with the openings 46. By these means the walls of these molds are held firmly together, so that longitudinal seams which would be produced on the bottles, if the molds were not perfectly closed, are avoided. If the molds are of a considerable length, this closing device may be duplicated. In this case one of them is placed near the shoulder and another near the base, so that the molds cannot open at either end. The bottom 7, which serves for giving the desired shape to the bottom of the bottle and besides for closing at the bottom the rough mold 5 and the finishing-mold 6, is secured to the rod *r*, terminating in a handle *s*, Figs. 1 and 6. This rod is held by the hinged bracket 22, consisting of two parts *t* and *t'*, connected by a pin *u*, so that the bottom can be raised and folded back, as shown in Fig. 7, when it is desired to pour glass into the rough mold 5 or lowered to close said mold after sufficient quantity of glass has been introduced into it. The two parts of the rough mold 5 having been brought together by the mechanism described, they are firmly secured together by causing the projections 45 to engage with the openings 46. Then the handle g is lowered, whereby the projections 45 are caused to make a quarter-revolution and are prevented from becoming disengaged from the openings 46, perfect closing of the rough mold being thus insured. After this has been done and after the pipe 37 through which compressed air is admitted has been closed in an air-tight manner by means of a cock or valve, the attendant introduces into this mold, by means of an iron rod or ladle, glass at a suitable temperature, consequently more or less liquid, according to its composition and to the weight, shape, and diameter of the neck of the object to be manufactured. In all these cases the glass must be fluid enough to easily flow into the neck of the mold and into the mold 26, placed underneath in order to enable the rim or any other relief part or recess serving for any mechanical stoppering device to be easily formed. As soon as the workman sees that a sufficient quantity of glass has been poured out into the rough mold he closes the mold by lowering the bottom 7 (see Fig. 7) by means of the handle s, as already described. Then to keep this bottom 7 firmly pressed against the rough mold 5 in order to avoid the formation of burs or seams the bar 21 is introduced under the hooks 20. After this the inlet-valve is opened to admit compressed air, and during the time that the air arriving round the rod 27 penetrates into the interior of the neck and forces the glass up against the bottom of the rough mold the workman passes the plate 23 under the hinged bracket 22. Then by turning the hand-wheel 4 he reverses the rough mold 5 bottom downward, as shown in Fig. 1, to enable the glass to become disengaged from the neck and from the lump. As soon as the glass has been forced by blowing against the walls of the rough mold and the bottom has received its shape the workman releases the bar 21 from the hooks 20 in order to enable the rough mold to be opened and, further, to enable the bottom 7 to receive the reciprocating or rotary motion which is communicated to it by the described mechanism. This bottom 7 remains maintained in place by the closing device constituted by the hinged bracket 22 and the plate 23. As soon, therefore, as the bar 21 has been disengaged from the hooks 20 the attendant quickly moves the two sections of the rough mold apart by raising the lever actuating the toothed wheel 12 and pinions 13. The finishing-mold is then closed round the partly-formed bottle by turning the hand-wheel 19, which by causing the spindle 15, carrying the toothed wheel 16, to rotate causes, by means of the pinions 17, secured on the arms 18, the two sections of this mold to come together.

It must be noted that during the time that the finishing-mold is being substituted for the rough mold the rough bottle is maintained in place by the rim in the mouth-mold 26 and is supported at the bottom by the bottom cover 7 on which it rests. As soon as the finishing-mold has been closed the attendant again opens the compressed-air-admission valve, (which had been closed during the interchange of molds.) Then by operating the handle l of the crank he communicates a reciprocating or rotary motion to the bottle during the time that it receives its shape under the action of the compressed air in the finishing-mold.

The motion communicated to the bottle during blowing has for its purpose to avoid the formation of uneven places on the walls of the bottle and to render them smoother; but for bottles or other articles with inscriptions or not requiring the absolute removal of small projections or irregularities that may be produced when the molds are not perfectly adjusted the mechanism serving for communicating motion to the bottle may be dispensed with. In this case compressed air is introduced into the bottle as soon as it has been placed in the finishing-mold.

The rim or other forms which are produced on the neck of the bottle either in intaglio or relief, in order to ornament the bottle or for stoppering or the like purposes, are formed in the mold 26, which is adjusted at the bottom of the neck of the rough mold by simple molding at the moment in which glass is poured into this mold.

As soon as the rough bottle has been pressed by the compressed air against the walls of the finishing-mold the bottle is completely finished. It therefore remains only to open the finishing-mold and the neck-mold in order to remove the bottle resting on the bottom 7 and to carry it to the annealing-oven when it has solidified sufficiently not to become deformed.

In addition to the formation of inscriptions, trade-marks, designs, &c., on the bottom of bottles when in the rough mold when the glass is very plastic inscriptions can be formed on the neck or even on the rim of the bottle, as the arrangement of this apparatus enables different characters to be very easily molded, said characters being formed in a very clear manner when the glass for the manufacture of the bottle is poured into the mouth-mold 26, this glass being nearly fluid when poured into the mouth-mold.

The described process is employed when it is desired to manufacture bottles or other articles of common quality for which a perfect brilliancy of glass is not required. In this case, as the mass of glass has in the first mold a length equal to that of the finishing-mold into which it is immediately introduced without having to wait till this mass is sufficiently elongated or increased in length, the rate of production is considerable, owing to the simplicity of the means used; but when it is desired to obtain more perfect products having a smoother and brilliant appearance the mechanism and means of manufacture is somewhat modified. As regards the mechanism, the modifications are illustrated in Fig. 9.

With the apparatus shown in Fig. 9 and following figures the manufacture of bottles, flasks, or other similar articles takes place, as follows: As soon as glass has been introduced into the rough mold 50 the workman applies the bottom cover 51 onto this mold and secures it by introducing the bar 52 into the hook 53. Then in order to perforate the interior of the neck of the bottle during the time that the glass is still plastic he opens the cock or valve, as explained before, in order to admit compressed air, which forces out this glass, and having perforated the interior of the neck to form a hole of a desired diameter, penetrates into the mass, which it presses against the walls and bottom of this first mold. Then this mold is opened by disengaging the bar 52 and by withdrawing the projection 45 from the opening 46, as before described. At this moment the mass of glass, which is considerably shorter than the finishing-mold, is suspended by the mouth-mold 26. Further, by pressing on the lever 54 the bottom cover 55 is raised till it touches the bottom of the mass 56, which is thus supported during the time that it elongates till the bottom cover 55 reaches the level of the bottom of the finishing-mold 57. The sections of this finishing-mold are then immediately brought together by rotating the hand-wheel 19, as already described, and the bottom 55 is fixed under this mold by causing the bar 58 to engage with the hooks 59. Then compressed air is admitted by opening the valve (which was closed during the lengthening of the glass mass) in order to enlarge said mass and to cause it to assume the shape of the finishing-mold, which has been securely closed by means of projections which were caused to engage with the openings, as before described. As it sometimes happens that during the expansion of the rough bottle or mass the neck becomes long and too thin either because the rough mold has been opened too soon, so that the glass had not had time to acquire the necessary consistency, or because the neck is not strong enough to support the too great weight of the rough article when articles of great size are manufactured and the neck becomes too thin for one or other of these reasons, this inconvenience is avoided by directing a jet of compressed air onto the part which has the tendency to become too thin. For this purpose I employ a pipe which admits air from the blower and closed by a cock or valve and terminating, for instance, in a crescent or semicircle. This end part of the pipe, provided with a number of small perforations, is directed against the portion of the neck or even any other part of the mass which shows a tendency to become inordinately thin in order that the compressed air striking against the glass at the desired spot will cause it to solidify and prevent it from becoming too long, which would otherwise take place. When the bottle has a flat, concave, or convex bottom, it is formed in the rough mold, the bottom of which is identical with that of the finishing-mold as far as regards the shape; but it is of smaller diameter to enable the glass to expand on the bottom of the finishing-mold. Finally, when it is desired to make the recess in the bottom of a bottle of considerable depth the cone 60 is raised at the last moment when the blowing is finished. For this purpose the cone 60, which surmounts the bottom cover 55 of the finishing-mold, to which it is attached by the spring 61, rises automatically when the lever 54 is depressed to raise the rod 62, to which the cone 60 is secured. It is easy to understand that as according to this arrangement the bottom cover 55, which engages with the bottom of the finishing-mold which it closes, cannot be raised by the action of the lever 54 only the valve 60 rises and presses the glass upward. As soon as the lever 54 is released the spring 67 returns the cone 60 back to its rest upon the bottom cover 55.

Common glass generally used for bottles and usually containing as bases a large proportion of lime, alumina, magnesia, and a little soda or potash possesses, owing to this composition, the property of losing its plasticity so quickly that very often the bottom of the bottle, especially when it is thin, becomes set and breaks when it is desired to press in the glass in order to form the coned recess. To avoid this drawback, it is necessary to maintain the glass at the necessary temperature and plasticity. I arrive at this result by using bottoms of molds made of substances which are bad conductors of heat, such as ordinary clay, kaolin, or other varieties of silicates of alumina, silicates of magnesia, especially talc, serpentine, or carbon in different forms. I also use the substances just mentioned for making the rod 27, which serves to close the entrance to the mold 26 when the necessary glass for the manufacture of a bottle is poured into the rough mold and into the mold 26. By this means the glass which falls on the rod 27 retains sufficient heat and plasticity to enable it to be forced out only by the action of compressed air introduced round the end of the rod 27 in a circular manner somewhat like the flame of an oil-lamp. As the glass which is in contact with the mold and the neck of the rough mold has solidified enough to form the neck of the bottle, while the central part has retained sufficient plasticity even at the bottom, which is in contact with the rod 27, the result of this combination is that air or any other suitable fluid is sufficient to perforate the interior of the neck and to form the neck of the bottle, flask, or other similar article without necessitating the introduction of a mandrel to perforate the interior of the neck of these articles. The rod 27, screwed into the pipe through which the compressed air arrives, terminates in an enlarged portion equal to the diameter which it is desired to give to the neck of the bottle. Such rod is shown in Fig. 8, or it may be provided with a thicker cylinder end, Fig. 14.

In Fig. 14× I show the mold 50 surmounted by the tube 82, which serves to conduct the steam into this mold above the glass therein in order to compress it.

In certain cases, more particularly when the interior of the neck of the articles to be manufactured has a considerable diameter, the rod 77' (shown in Fig. 15) is employed. This rod, which also carries at the top a cylinder made of clay, talc, or any other substance which is a bad conductor of heat, is hollow, so as to afford a passage for compressed air, which, raising the valve 77, penetrates into the glass at the center during the time that the greater part of the compressed air arrives round the top of the rod, as I have explained before. This combination of parts causing air to penetrate through the center and round the rod 27 enables the glass to be better forced out and the perforation of the neck of the articles with large necks to be easily effected.

When it is desired to manufacture articles with large holes or necks, as the water-bottles or carafes or wine-glasses, the rod is surmounted by a plate of the shape and diameter corresponding to the opening of the article to be manufactured. This plate, on which the glass falls when it is introduced into the hollow of the rough mold, must be made of a substance which is a bad conductor of heat, as before explained.

When the glass, owing to its constitution or temperature at which it was tapped, becomes too quickly of paste-like consistency, whereby it is not sufficiently fluid to form the rim properly or to acquire the homogeneity required, atmospheric pressure is used for compressing it, which is obtained by producing a vacuum in the neck of the mold and in the pipe 37, leading to the mold. For this purpose a branch pipe 37' is arranged on the pipe 37, and by means of a pump or any other suitable apparatus the air contained in the mold and in this pipe is pumped out at the moment when the glass is introduced into the rough mold. A better effect can be obtained by introducing compressed air at the other end—that is to say, into the portion of the rough mold comprised between the bottom of the mold and the glass which is introduced into it. Finally, for the manufacture of certain kinds of bottles and of other articles steam is sometimes used to compress the glass after it has been introduced into the rough mold in order to give the homogeneity required in order to make the walls of the article to be manufactured of uniform thickness and to enable the rings and other ornamentations on bottles, as well as handles on vases, &c., to be suitably molded.

The means which may be used to introduce steam to the glass in order to compress it are numerous and vary, as well as the pressure of steam, which must depend on the nature of glass, shape, and volume of the articles to be manufactured; but generally steam is used only of from five-hundred-grams (one-pound) pressure to one-kilogram pressure per square centimeter, as this pressure is ample. Finally, to introduce steam to the glass, on which its action resembles a sudden shock, a pipe is used surrounded by a flange, which is fitted to the bottom of the rough mold and completely covers the opening made in the bottom of said mold for introducing glass. As soon, therefore, as the necessary quantity of glass has been introduced into the rough mold 50, Fig. 14×, the attendant lowers the pipe 82 onto the bottom of this mold and opens the cock or valve arranged on the pipe in order to admit steam, which exerts pressure on the glass and causes it to adapt itself to the shape of the lower part of the rough mold, which at the moment of introduction of steam is in the reverse position—i. e., neck downward—as shown in Fig. 14. As bottle-glass quickly loses its plasticity, the workman closes the valve admitting steam and raises the pipe as soon as the necessary compression has been obtained. Then he closes the bottom of the rough mold and immediately opens the valve of the pipe admitting compressed air in order to act on the mass in this first mold, as hereinbefore explained.

In Figs. 12 and 14×, 9 represents the stems or arms for the mold, and in Fig. 4 $r$ is the stem or arm for the mold seen in that figure.

The junction of the parts or sections of the mold is never sufficiently perfect whatever be the closing device used to prevent formation of seams or joints, into which glass penetrates all the more easily under the action of the compressed air, as the glass is generally introduced in a nearly liquid state.

In order to avoid or at least considerably reduce the seams formed when glass thus penetrates into the joints of the rough mold and when the bottle does not receive a rotary motion or a reciprocating movement, it has been found advantageous to produce around this mold a pressure nearly equal to that in the interior when compressed air has been introduced into it to act on the mass. For this purpose the mold is surrounded by a shell 63, Fig. 11, in order to obtain a hollow forming an air-chamber 64, surrounding the rough mold over the whole of its surface. It is sufficient, therefore, to introduce compressed air into this air-chamber 64, whereby this external pressure, acting on the joints of the rough mold, will prevent glass from penetrating into them, and in order to prevent compressed air from escaping outside a groove is made in the edge of one part of this shell or casing 63, with which engages a rib on the opposite side.

In order to obtain a more perfect air-tight closing, the groove may be packed with asbestos or any other suitable substance.

Fig. 12 shows a mold with a double casing 75, and the space existing between the two walls may be filled with insulating material, so as to prevent the mold from attaining too high a temperature.

Finally the air which is caused to circulate round the rough mold in the manner just explained prevents the mold from becoming too hot and by thus cooling the glass contained in the mold insures a quicker and more regular manufacture.

The compressed air for the air-chamber 64 is introduced through a pipe provided with a valve on the shell 63, and when the rough bottle or article is blown out said air is discharged by opening a valve arranged in another part of the shell.

Compressed air can even be caused to circulate round the bottom cover 51 by surmounting it with a double cover and by placing the hollow space thus formed in communication with the air-chamber 64.

$r$ is the stem for the mold seen in Fig. 11.

The closing device of the mold in which the rim 26 is molded consists of a plate forming a hollow surrounding this rim-mold 26. Two cam-grooves 72 are made in this plate 78, which terminates in a handle 70. On the other hand, two pins 71 are placed in the hinges 30 of the mold 26. It will be now easy to understand that when the plate 78 is caused to turn by means of the handle 70—say from right to left—the grooves 72, which decrease in width and have eccentric shape, bring the two sections of the mold 26 nearer together and maintain them in place by pressure exercised by the plate 78 against the pins 71. When it is desired to open the mold in order to remove the bottle and to take it to the annealing-oven, the plate 78 is turned in the opposite direction by means of the handle 70. It is also necessary to lower the bottom 55 of the finishing-mold by bringing back the handle 65 of the pipe 66, in which is inclosed the spring 67. In this way the stop 60, which is engaged and held by the spring 67 in a groove made in the rod 62, becomes disengaged from this opening, and the rod 62 descends and lowers the bottom cover 55 into the position indicated in Fig. 9. The tube 82, (seen in Fig. 14$^\times$,) which is used for the introduction of steam above the glass, is simply fixed to a flange on the bottom of the mold, which it closes. The tube leads from any source of steam-supply and during the operation takes the place of collar 35, (seen in Fig. 1,) which serves for the introduction of the compressed air.

The machine shown in the various figures of the accompanying drawings requires the attendance of only two workmen, (one at the mold and one for bringing the liquid glass to the mold,) and it may be used in the manufacture of bottles of all kinds with flat or recessed bottoms, flasks, vases, (with or without handles,) water-bottles, and other similar articles. It is not necessary for these workmen to possess special knowledge, and the work of the man at the mold is not difficult considering that he may remain seated during the greater part of the time necessary for the manufacture of each article. When the glass contains enough alkali to enable several successive charges of glass to be taken from the same vessel, one workman can attend to several machines.

When bottles or other articles manufactured by the process herein described are to have thick walls or when the glass used contains a large proportion of alkali, (which enables it to preserve the plasticity for a long time,) it becomes necessary to wait for a certain time before taking out the bottle, so as to avoid the risk of its becoming deformed in handling; but this waste of time can be avoided, and consequently the rate of production increased, by arranging frames sufficiently large to support several molds, or it is possible to use two simple machines for each stand. In this way the rate of production for each working place is considerably increased.

The blowing of bottles by the means described is effected by compressed air or by any other suitable fluid used at the temperature of the room or at a higher temperature. The pressure must be determined according to the weight and volume of the objects to be manufactured and also according to the composition of the glass, on which depends its plasticity, consequently its more or less rapid solidification. The air compressed by a pump, blower, or any other suitable device is supplied to the machines by pipes provided with cocks or valves, which the workmen operate by hand, or the valves may close automatically by means of springs which enable the workman to open them with his foot, having thus the hands free for other manipulations. The valves may also be arranged to be closed and opened by the parts effecting the closing and opening of the molds 5 and 6.

I claim and desire to secure by Letters Patent—

1. In a machine for the manufacture of bottles and other hollow articles of blown glass, the combination with the frame, a rotatable bar, the sectional rough and finishing molds arranged in the same plane, a bottom cover for closing the bottom of both molds, mechanism for opening and closing the molds and a bayonet-closed device for firmly securing the bottom cover to each mold, substantially as described.

2. In a machine for the manufacture of bottles and other hollow articles of blown glass, the combination with the frame, a rotatable bar, the sectional rough and finishing molds arranged face to face and on the same plane, means for closing and opening the molds, a bottom cover for closing the bottoms of both molds, bayonet securing device for holding their bottoms, and a closing device to hold the sections of the molds firmly together, substantially as described.

3. In a machine for the manufacture of bottles and other hollow articles of blown glass, the combination with the frame, mold-supporting bar, rough and finished molds arranged face to face and in the same plane, mechanism for opening and closing them, a bottom for said molds, a bayonet closing device for holding the bottom and a closing device for holding the sections of the rough and finishing mold pressed tightly together, the said rough mold being shaped to form the bottom of bottles, flasks and the like, substantially as described.

4. In a machine for the manufacture of bottles and other hollow articles of blown glass, the combination with the frame, mold-supporting bar, a sectional rough mold to form the bottoms of bottles and the like, a sectional finishing-mold arranged face to face with the rough mold and in the same plane, mechanism for opening and closing the sections of the molds, a bottom common to both molds, means for securing the bottom in position, means for holding the sections of the two molds pressed tightly together, the collar-mold constructed to form a hollow to enable the rim and the end of the neck to be maintained at a sufficiently high temperature, thus preventing the mouth of the bottle from cracking or breaking owing to too sudden cooling, substantially as described.

5. In a machine for the manufacture of bottles and other hollow articles of blown glass, the combination with the frame, mold-supporting bar, a rough mold to form the bottoms of the bottles, flasks and the like, a finishing-mold arranged face to face and in the same plane with the rough mold, mechanism for opening and closing sections of the mold, a bottom common to both molds, a closing device for securing the bottom, closing device for holding the sections of the two molds pressed tightly together, the collar for permitting the rim and the end of the neck to be maintained at a sufficiently high temperature, and the rod 27 of non-conducting material which forms a bottom for the neck-mold, all arranged and adapted for operation as and for the purpose specified.

6. In a machine for the manufacture of bottles and other hollow articles of blown glass, the combination of the frame, mold-supporting bar, a rough mold enabling the bottom of articles to be produced, a finishing-mold arranged face to face and in the same plane as the rough mold, mechanism for opening and closing the molds, a closing device for holding the bottom, a closing device for holding the sections of the two molds pressed tightly together, the collar-mold for maintaining the rim and the end of the neck at a sufficiently high temperature, the rod 27 of non-conducting material which forms a bottom for the neck-mold and mechanism for communicating a rotary motion to the bottle-blank during blowing, substantially as described.

7. In a machine for the manufacture of bottles and other hollow articles of blown glass, the combination of the frame, mold-supporting bar 3, a rough mold for forming the bottom of bottles, carafes and the like, a finishing-mold arranged face to face and in the same plane as the rough mold, mechanism for opening and closing the molds, a bottom for the molds, a bayonet closing device for securing the bottom in place, a closing device for holding the sections of the two molds pressed tightly together, a collar-mold for maintaining the ring and the end of the neck at a sufficiently high temperature, the rod 27 of non-conducting material which forms a bottom for the neck-mold, mechanism for communicating a rotary or reciprocating motion to the bottle-blank during the blowing, an outer casing for forming a vacuum in the neck of the rough mold and in the collar-mold at the moment when the glass is being introduced into the rough mold, substantially as and for the purposes described.

8. In a machine for the manufacture of bottles and other hollow articles of blown glass, the combination of a frame, mold-supporting bar, a rough mold for forming the bottom of bottles, means whereby a vacuum is made in the necks of the mold at the moment when the glass is poured in, a finishing-mold arranged face to face and in the same plane with the rough mold, mechanism for closing and opening the molds, a bottom for the molds, the bayonet closing device for securing the bottom in place, closing device for holding the sections of the two molds pressed tightly together, a collar-mold, means whereby a vacuum is produced in the neck of the collar-mold at the moment when the glass is poured in and said collar-mold maintaining the collar and the end of the neck at a sufficiently high temperature, a rod of non-conducting material which forms a bottom for the neck-mold, and mechanism for communicating a rotary motion to the bottle-blank during the blowing operation, substantially as and for the purpose described.

9. In a machine for the manufacture of bottles and other hollow articles of blown glass, the combination of a frame, a mold-supporting bar, a rough mold having double walls forming an air-chamber said molds enabling the bottom of bottles to be formed, a finishing-mold placed face to face and in the same plane as the rough mold, mechanism for opening and closing the molds, a bottom for the molds bayonet closing device for holding the bottom made of non-conducting material, a closing device for holding the sections of the two molds tightly together, a collar-mold, a rod of non-conducting material which forms a bottom for the neck-mold and mechanism for communicating a rotary motion to the bottle-blank during the blowing, substantially as set forth.

10. In a machine for the manufacture of bottles and other hollow articles of blown glass, the combination of a frame, mold-supporting bar, a rough mold having double walls and permitting the bottom of a bottle to be formed, finishing-molds arranged face to face and in the same plane with the rough mold, said molds having double walls forming a hollow space between them, mechanism for opening and closing the molds, a bottom for the molds, a bayonet closing device for securing the bottom made of material which is a bad conductor of heat, a closing device for holding the sections of the two molds tightly pressed together, a collar-mold adapted for maintaining the rim and the end of the neck at a sufficiently high temperature, a rod of non-conducting material which forms the bottom of the neck-mold, and mechanism for communicating a rotary motion to the bottle-blank during the blowing, substantially as and for the purpose described.

11. In a machine for the manufacture of bottles and other hollow articles of blown glass, the combination of the frame, mold-supporting bar, a rough mold having double walls enabling the bottom of a bottle to be formed, a finishing-mold having double walls and arranged face to face and in the same plane with the rough mold, mechanism for opening and closing the molds, a bottom for the molds, a bayonet closing device for securing the bottom, a closing device for holding the sections of the two molds tightly pressed together, a collar-mold for maintaining the rim and the end of the collar at a sufficiently high temperature, a rod of non-conducting material which forms the bottom of the neck-mold and mechanism to communicate a rotary motion to the bottle-blank during the blowing, the rough mold being so formed at its base as to produce a uniform distribution of glass in the walls and in the bottom of the bottle, substantially as and for the purpose described.

In witness whereof I hereby set my hand in the presence of two subscribing witnesses.

CLAUDE BOUCHER.

Witnesses:
 LOUIS ELICHAGARAY,
 ALFRED VICTOR.